(12) United States Patent
Raff et al.

(10) Patent No.: US 10,286,761 B1
(45) Date of Patent: May 14, 2019

(54) PASSENGER VEHICLE DOOR AND WINDOW

(71) Applicants: John Raff, Menlo Park, CA (US); Donald R. Monroe, Los Gatos, CA (US)

(72) Inventors: John Raff, Menlo Park, CA (US); Donald R. Monroe, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/613,969

(22) Filed: Jun. 5, 2017

Related U.S. Application Data

(60) Provisional application No. 62/346,109, filed on Jun. 6, 2016.

(51) Int. Cl.
  *B60J 5/04* (2006.01)
  *B60J 1/17* (2006.01)

(52) U.S. Cl.
  CPC .............. *B60J 5/0419* (2013.01); *B60J 1/17* (2013.01); *B60J 5/045* (2013.01); *B60J 5/0415* (2013.01); *B60J 5/0455* (2013.01)

(58) Field of Classification Search
  CPC ........ B60J 5/0419; B60J 5/0455; B60J 5/045; B60J 1/14; B60J 1/16; B60J 1/17
  USPC ........................................... 296/146.2, 146.3
  See application file for complete search history.

(56) References Cited

U.S. PATENT DOCUMENTS

| | | | |
|---|---|---|---|
| 3,019,492 A | * | 2/1962 | Schimek .................... B60J 5/06 49/212 |
| 5,095,655 A | * | 3/1992 | Warren ..................... B60J 10/24 49/374 |
| 5,224,752 A | | 7/1993 | Marshall |
| 5,431,476 A | | 7/1995 | Torigaki |
| 5,800,007 A | | 9/1998 | Cho |

(Continued)

OTHER PUBLICATIONS blogspot.com, "The Electric BMW i3: BMW i3 Repair Process Deep Dive", Posted by Tom Moloughney on Jul. 11, 2014, Downloaded Oct. 20, 2016, http://bmwi3.blogspot.com/2014/07/bmw-i3-repair-process-deep-dive.html, 8 pp.

(Continued)

*Primary Examiner* — Dennis H Pedder
(74) *Attorney, Agent, or Firm* — Young Basile Hanlon & MacFarlane, P.C.

(57) ABSTRACT

A passenger vehicle includes a body, a powertrain, a first door, and a second door. The body defines a passenger compartment having an opening. The powertrain propels the passenger vehicle on a public roadway. The first door is movably coupled to the vehicle body to at least partially close the opening. The first door includes a door structure, which defines a cavity, and a first window that is movable between a lowered position in the cavity and a raised position in which a forward edge thereof is substantially coextensive with a forward end of the cavity. The second door is movably coupled to the vehicle body to at least partially close the opening. The second door includes a second window having a second forward edge. The rearward edge of the first window at least one of engages the second forward edge or compresses a seal with the second forward edge.

21 Claims, 11 Drawing Sheets

(56) References Cited

U.S. PATENT DOCUMENTS

| | | | |
|---|---|---|---|
| 6,425,208 B1* | 7/2002 | Klueger | E05F 11/382 49/348 |
| 6,926,340 B2 | 8/2005 | Moriyama | |
| 8,793,938 B2* | 8/2014 | Grudzinski | B60J 1/17 49/441 |
| 2002/0175537 A1 | 11/2002 | Cress | |
| 2003/0122400 A1* | 7/2003 | Berglund | B60R 13/04 296/146.9 |
| 2004/0104592 A1 | 6/2004 | Fisher | |
| 2005/0093335 A1 | 5/2005 | Herrmann | |
| 2006/0125284 A1 | 6/2006 | Kristl | |
| 2007/0102955 A1* | 5/2007 | Bodin | B60J 5/0425 296/146.6 |
| 2007/0187986 A1 | 8/2007 | Wikstrom | |
| 2007/0210611 A1 | 9/2007 | Melz et al. | |
| 2009/0146451 A1* | 6/2009 | Broadhead | B60J 5/0416 296/146.6 |
| 2009/0184501 A1 | 7/2009 | Hirotani | |
| 2009/0236871 A1 | 9/2009 | Shibasaki | |
| 2010/0148535 A1 | 6/2010 | Takahashi et al. | |
| 2012/0133175 A1* | 5/2012 | Charnesky | B60J 10/40 296/146.4 |
| 2013/0057018 A1 | 3/2013 | Reese | |
| 2016/0145913 A1 | 5/2016 | Machida et al. | |
| 2017/0240029 A1 | 8/2017 | Moriyama | |
| 2017/0362878 A1* | 12/2017 | Gage | B60J 1/17 |

OTHER PUBLICATIONS blog.caranddriver.com, "Mercedes-Benz F 015 Luxury in Motion Concept: Is This the Vehicular Future?", Mercedes-Benz F 015 Luxury in Motion Concept Debuts—News—Car and Driver, Jan. 6, 2015, by Jens Meiners, Downloaded Jun. 5, 2017, http://blog.caranddriver.com/mercedes-benz-f-105-luxury-in-motion-conept-is-this-the-vehicular-future/, 7 pp.

autoblog.com, "Mercedes-Benz reveals Ocean Drive concept for Detroit", Dec. 20, 2006, by Alex Nunez, Downloaded Jun. 5, 2017, http://www.autoblog.com/2006/12/20/mercedes-benz-reveals-ocean-drive-concept-for-detroit/, 11 pp.

blog.caranddriver.com, "Cadillac Ciel Concept", Car News, Aug. 2011, by Jared Gall, Downloaded Jun. 5, 2017, http://blog.caranddriver.com; /news/cadillac-ciel-concept-news; /photo-gallerty/cadillac-ciel-concept-news, 9 pp.

octopup.org, "Discover the significant changes in the timeless Lincoln Continental for 1964", Form No. LC-64-109, Printed USA Aug. 1963, Downloaded Jun. 5, 2017, http://octopup.org/img/car/lincoln/info/1964-Lincoln--Brochure.pdf, 19 pp.

thesamba.com, "The Ghia-Karmann Volkswagen", Apr. 1956, Downloaded Jun. 5, 2017, https://www.thesamba.com/vw/archives/lit/ghia_roadtests/april-56-r_t-KG-review-pg1.jpg and https://www.thesamba.com/vw/archives/lit/ghia_roadtests/april-56-r_t-KG-review-pg2.jpg, 2 pp.

Siler, Steve, "2016 Rolls-Royce Dawn", The Term "Ragtop" Has Never Been More of a Misnomer, Mar. 2016, http://www.caranddriver.com/reviews/2016-rolls-royce-dawn-first-drive-review, 15 pp.

Pund, Daniel, "2014 Rolls-Royce Wraith", Ghost in the Machine, Sep. 2013, http://www.caranddriver.com/reviews/2014-rolls-royce-wraith-first-drive-review, 32 pp.

\* cited by examiner

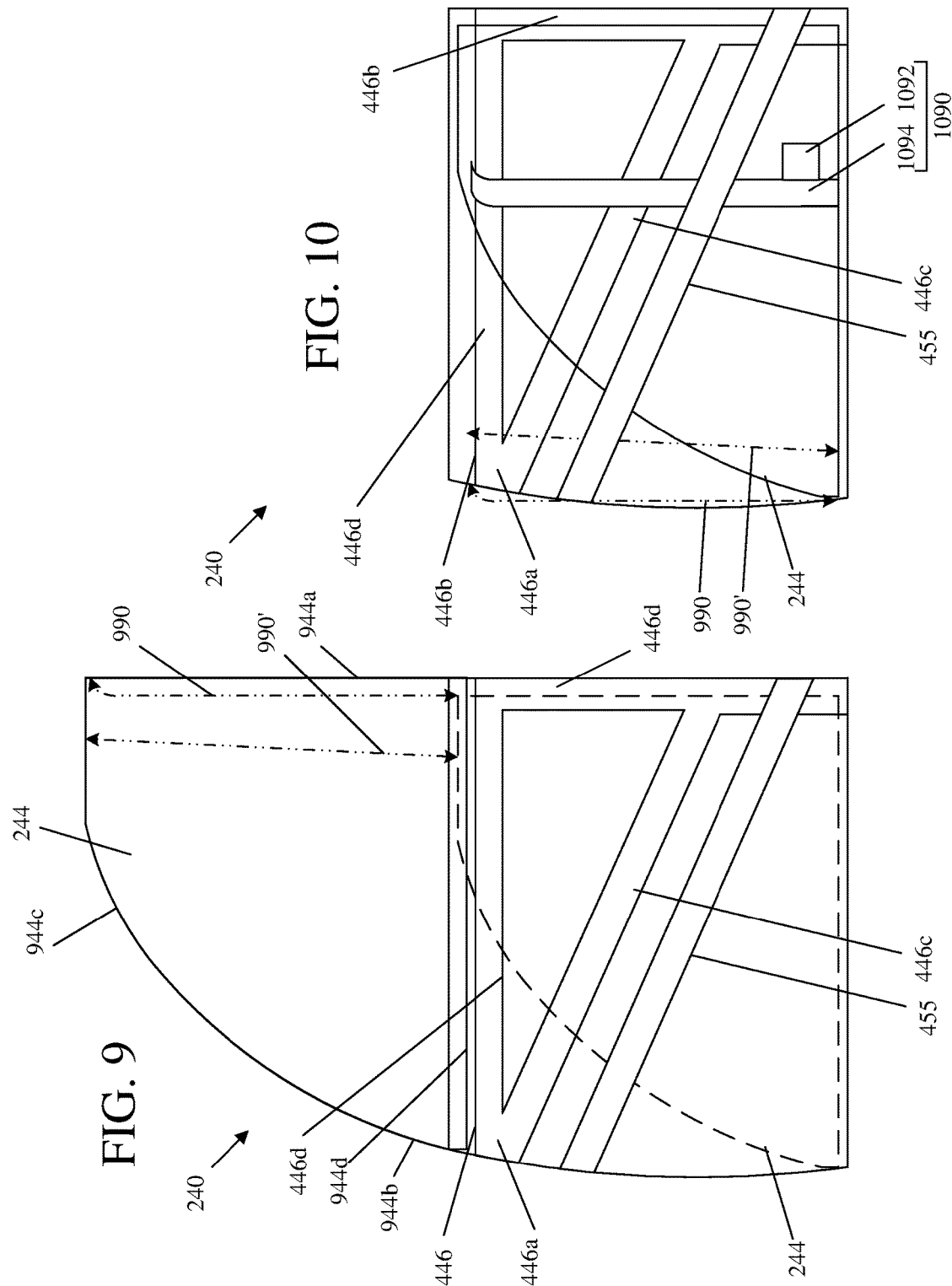

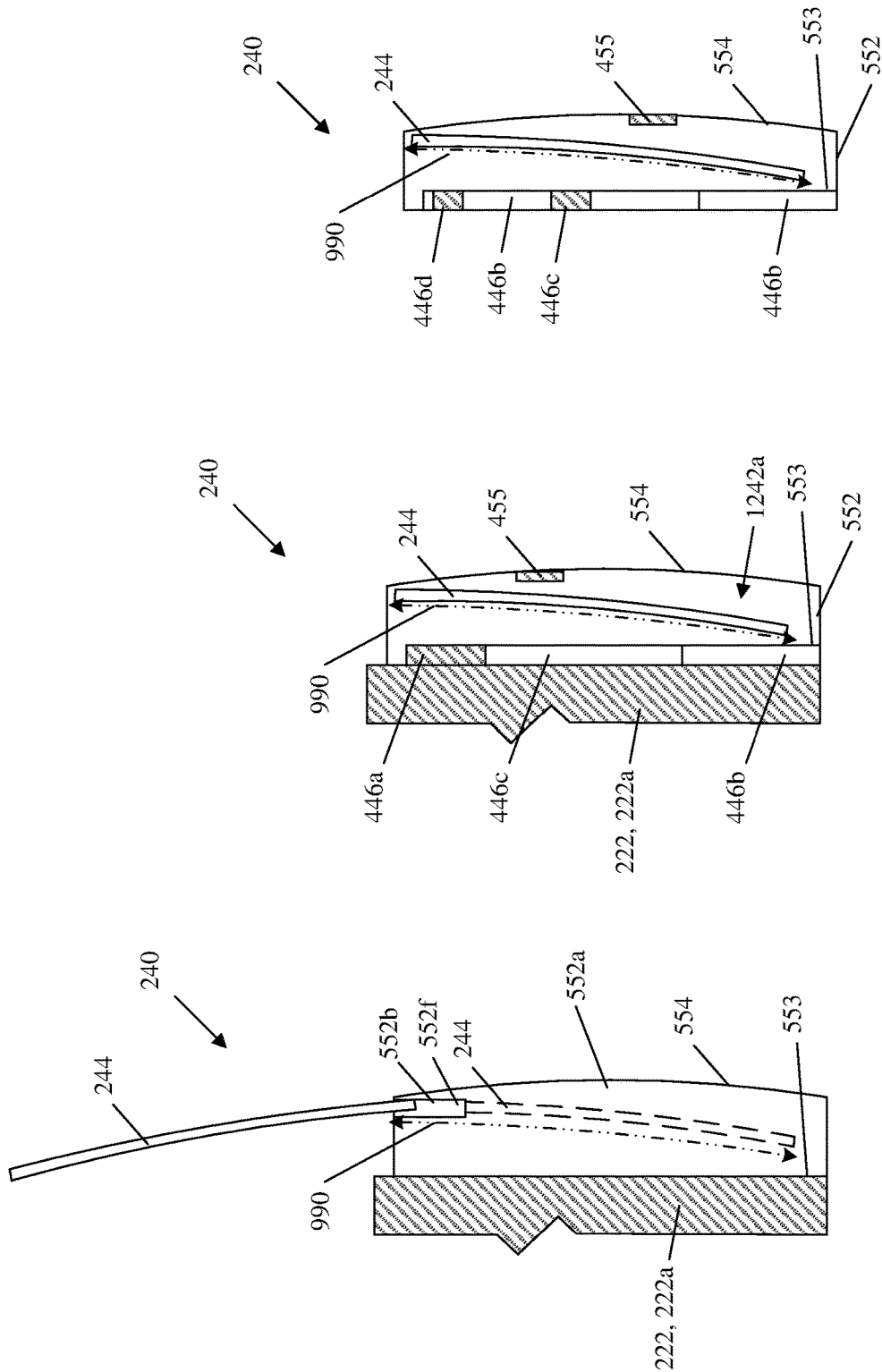

PASSENGER VEHICLE DOOR AND WINDOW

CROSS-REFERENCE TO RELATED APPLICATION(S)

This application claims priority to and the benefit of U.S. Provisional Application No. 62/346,109, filed Jun. 6, 2016, the entire disclosure of which are hereby incorporated by reference. This application additionally incorporates the disclosure U.S. Provisional Application No. 62/350,871, filed Jun. 16, 2016, by reference in its entirety.

TECHNICAL FIELD

This disclosure relates to passenger vehicles for roadways and, in particular, to door structures therefor.

BACKGROUND

Passenger vehicles for roadways, such as cars, trucks, or other automobiles, typically include doors with windows that are retractable into cavities of the doors. However, traditional internal door structures, such as those for transferring loading to a vehicle body of the vehicle during standardized loading events (e.g., standard dynamic and quasi-static loading during test procedures under Federal Motor Vehicle Safety Standards (FMVSS) 214), require that the windows be retracted into positions that are spaced apart from an end of the door. For example, a traditional load transferring door structure extends inboard across an inboard-outboard thickness of the door, so as to be in close proximity to the vehicle body (e.g., an A-, B-, or C-pillar) for transferring the standard loading thereto. As a result, this load transferring structure occupies the volume of the door cavity at its forward and/or rearward ends, which prevents the window from being retracted into the end volumes. With the window being spaced apart from the forward and/or rearward ends of the door when retracted, the edge of the window must similarly be spaced apart a noticeable distance (e.g., several inches) from the end of the door when the window is raised. For example, a forward edge of the window may be spaced rearward of a forward end of a front door, or a rearward edge of the window may be spaced forward of a rearward end of a rear door. Accordingly, traditional doors for passenger vehicles include fixed or non-retractable structures to fill a gap formed between the visible door structure (e.g., above the beltline or outer door panel), forward or rearward window edge, and vehicle body (e.g., A- or C-pillar). Such fixed structures may include various combinations of fixed window panels, opaque panels, mirror attachments, window frames, etc., which may interrupt or block a passenger's view outside the vehicle and may limit an openable region of the door. Placement of these fixed structures also results in a discontinuous or interrupted cut line (i.e., visible division between vehicle components) between the vehicle body (e.g., including the A- or C-pillar, front or rear quarter panel), and the window and visible door panel.

SUMMARY

In an implementation, a passenger vehicle includes a vehicle body, a powertrain, a first door, and a second door. The vehicle body defines a passenger compartment having an opening for a passenger to enter into and exit out of the passenger compartment. The powertrain is configured to propel the passenger vehicle on a public roadway. The first door is movably coupled to the vehicle body to at least partially close the opening. The first door includes a first door structure and a first window. The first door structure defines a first cavity. The first window is movable between a first lowered position in the first cavity and a first raised position in which a first forward edge of the first window is substantially coextensive with a forward end of the first cavity in a fore-aft direction at a beltline of the passenger vehicle. The second door is movably coupled to the vehicle body to at least partially close the opening. The second door includes a second window having a second forward edge. The rearward edge of the first window at least one of engages the second forward edge or compresses a seal with the second forward edge.

In an implementation, a door for a passenger vehicle for use on a public roadway includes a door structure and a window. The door structure defines a cavity, and includes an outboard panel, a primary internal door structure located within the cavity, and an intrusion beam located within the cavity. The window is movable between a retracted position within the cavity and a raised position protruding from the cavity. In the retracted position, the window is outboard of the primary internal door structure and inboard of the intrusion beam.

In an implementation, a vehicle includes a vehicle body, a powertrain, and a vehicle door. The vehicle body defines a passenger compartment and includes an opening for passengers to enter into and exit from the passenger compartment. The vehicle body includes a body structure that supports a windshield. The powertrain is configured to propel the vehicle on a public roadway. The vehicle door is movable between an open position allowing passengers to enter into and exit from the passenger compartment and a closed position restricting passengers from entering into and exiting from the passenger compartment. The vehicle door includes a retractable window that engages the body structure and another window of another vehicle door in a beltline of the vehicle.

BRIEF DESCRIPTION OF THE DRAWINGS

FIG. 9 is a side view of a first door without an outboard panel and a window depicted in a lowered position in phantom.

FIG. 10 is a side view of the first door without the outboard panel and the window depicted in the lowered position.

FIG. 11 is a cross-sectional view of the passenger vehicle taken along line 11-11 from FIG. 2 depicting the window in a raised position without phantom and in a lowered position in phantom.

FIG. 12 is a cross-sectional view of the passenger vehicle taken along line 12-12 from FIG. 2 depicting the window in the lowered position.

FIG. 13 is a cross-sectional view of the passenger vehicle taken along line 13-13 from FIG. 2 depicting the window in the lowered position.

DETAILED DESCRIPTION

As discussed in further detail below with reference to the figures, an exemplary passenger vehicle includes a vehicle body and one or more doors having an internal load transfer structure configured to absorb and/or distribute loading of the doors to the vehicle body, along with a retractable window. The window is retractable into a cavity of the door and includes forward and/or rearward edges that may be substantially coextensive with a forward and/or rearward ends of the visible door structure. Also within the cavity, the door includes a door structure configured to absorb and/or distribute loading from standardized loading events, such as a standard dynamic loading event (e.g., from a mobile deformable barrier (MDB) during dynamic testing under Federal Motor Vehicle Safety Standard (FMVSS) 214D) and from a quasi-static loading event (e.g., during quasi-stating testing under FMVSS 214S). The vehicle body, doors, and their various subsystems, subassemblies, components, and related methods may, however, provide various other advantages.

As used herein directional terms, such as "forward," "rearward," "fore," "aft," etc. are oriented with respect to a normal direction of travel of the vehicle. Directional terms "inboard" and "outboard" refer to generally horizontal directions moving, respectively, from outside to inside, or inside to outside, a passenger compartment of the passenger vehicle.

Figure 1:
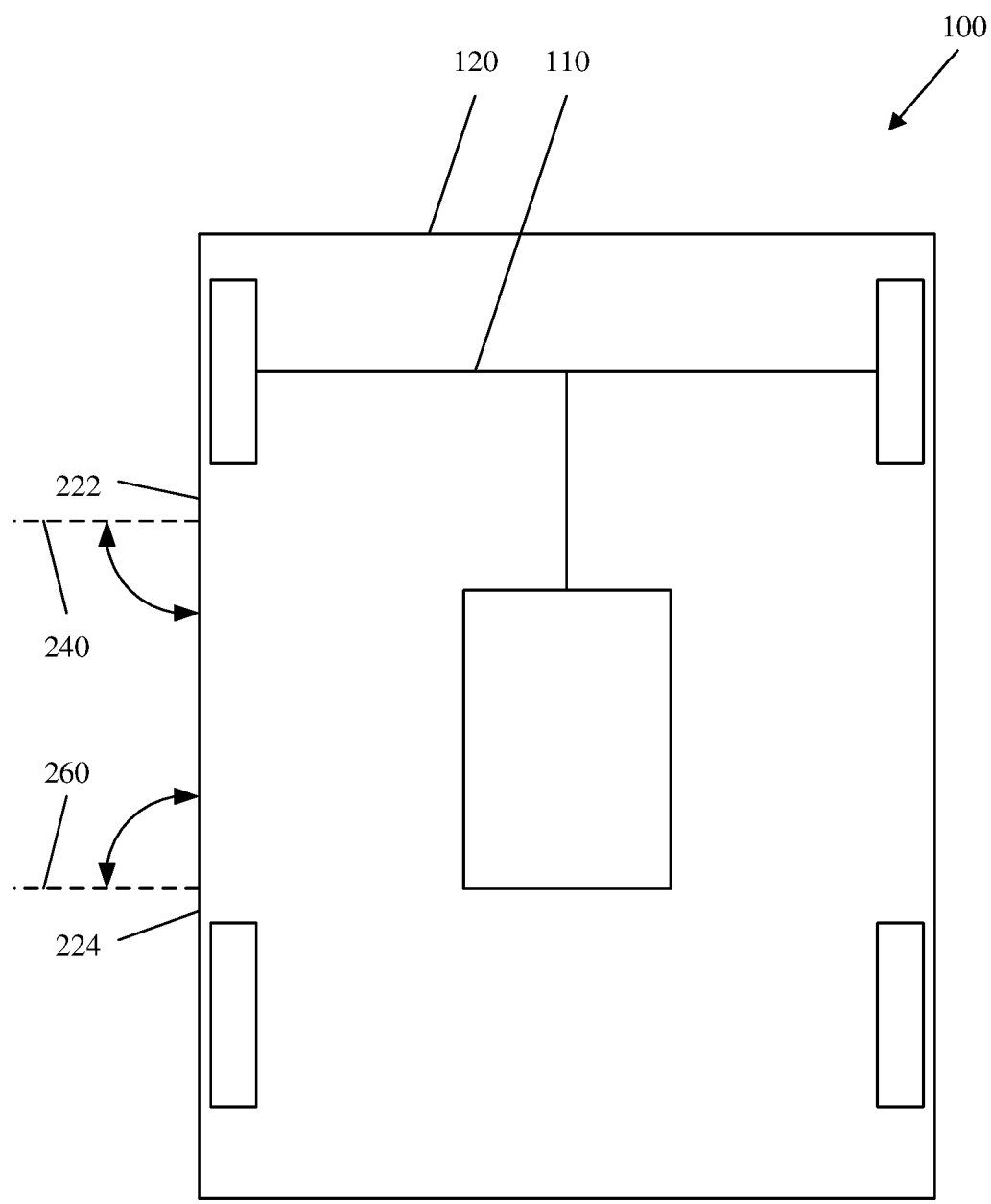
FIG. 1 is top schematic view of a passenger vehicle according to an exemplary embodiment.

Referring to FIG. 1, a vehicle 100 (e.g., passenger vehicle) is configured for use on a public roadway, such as a highway, interstate freeway, or local roads managed by a federal, state, or local government. As shown schematically, the vehicle 100 generally includes a powertrain 110 and a vehicle body 120 (e.g., body structure) coupled to the powertrain 110. The powertrain 110 is configured to convert energy from a stored energy source (e.g., battery, gasoline, diesel fuel, hydrogen, etc.) into motive force for propelling the vehicle 100 along the public roadway. For example, the powertrain 110 may include one or more electric motors and/or one or more combustion engines that rotate wheels for propelling the vehicle 100 along the roadway.

Figure 2:
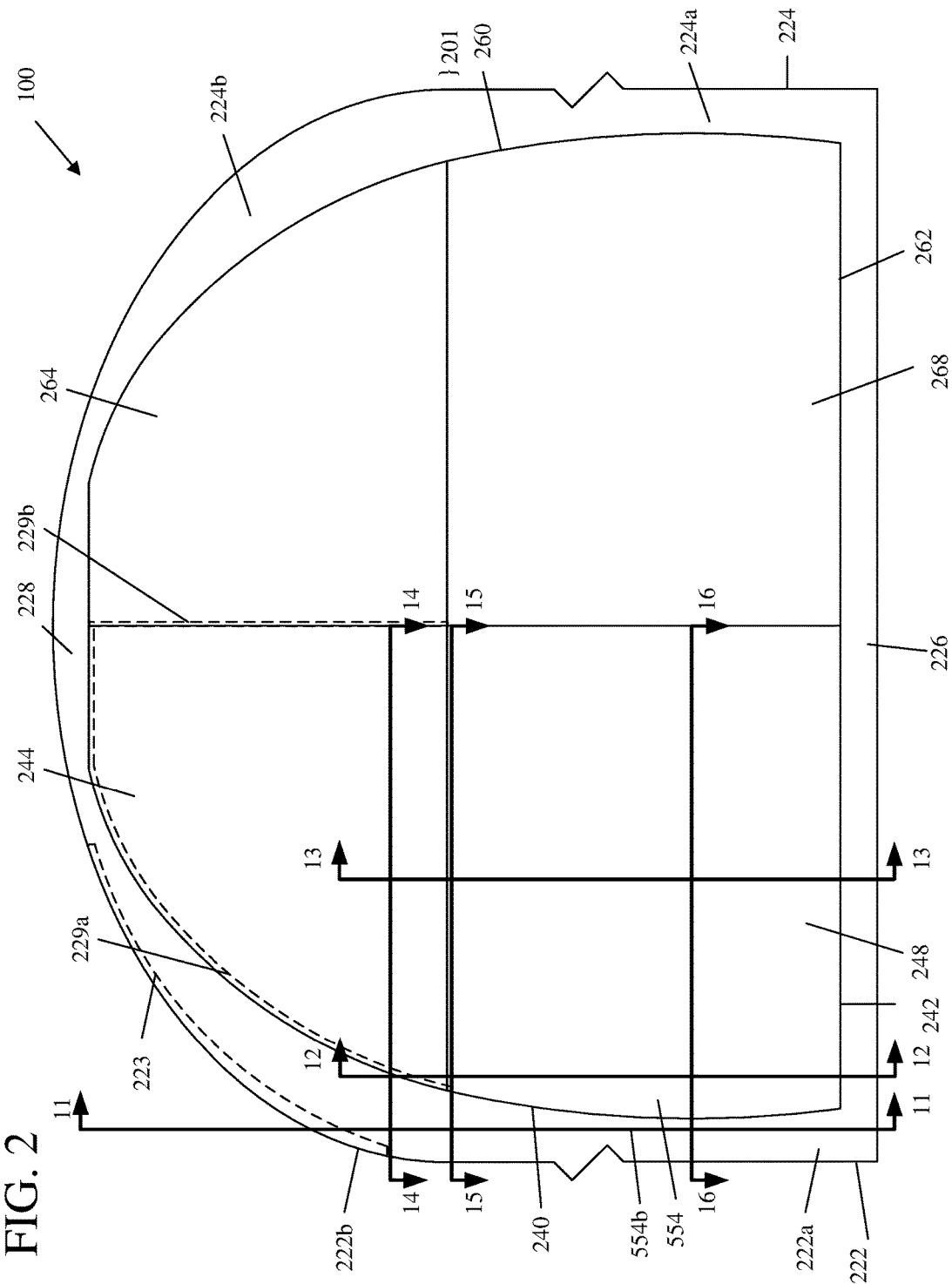
FIG. 2 is a side view of the passenger vehicle in a first configuration with closed doors.
Figure 3:
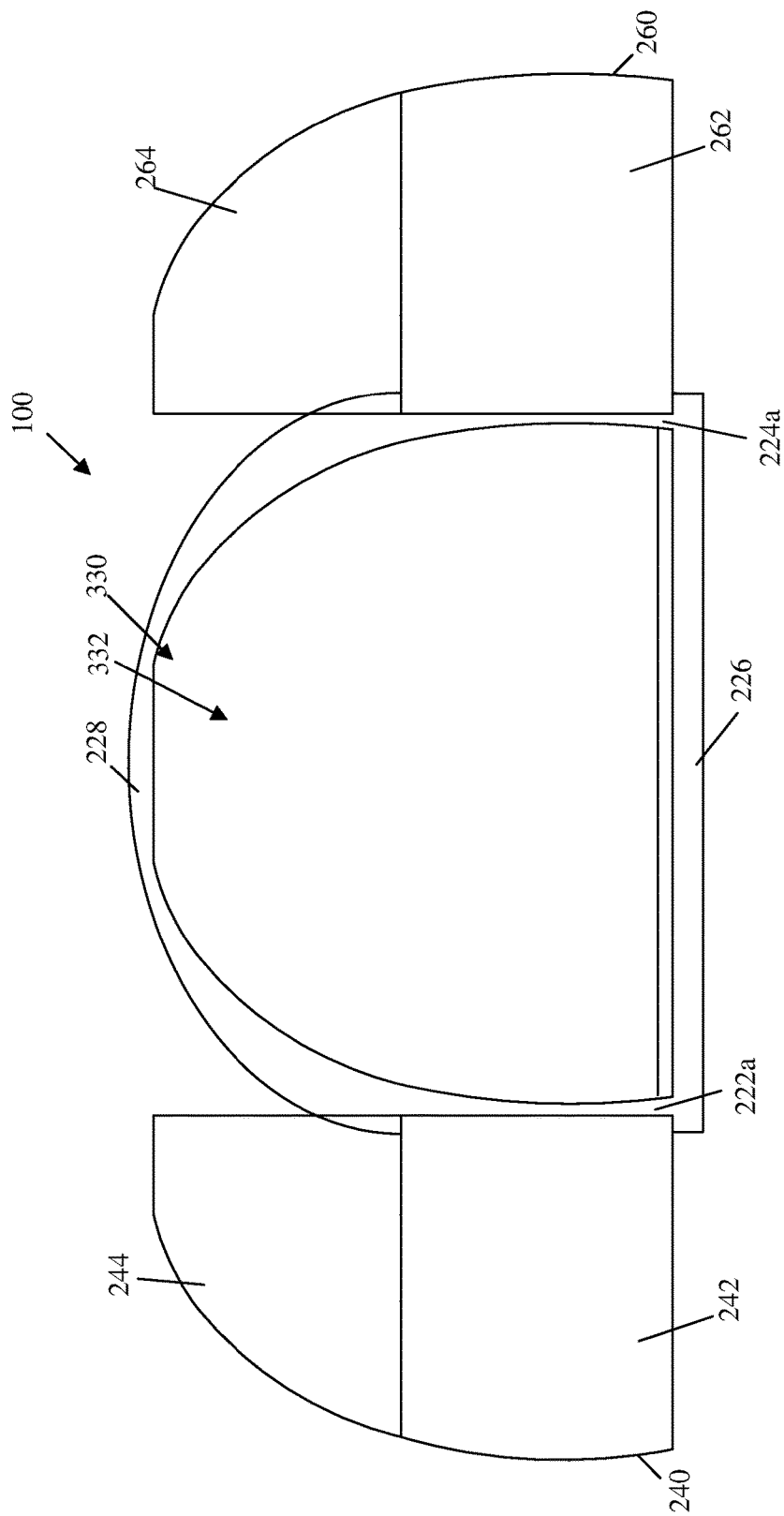
FIG. 3 is a side view of the passenger vehicle in a second configuration with open doors.
Figure 8:
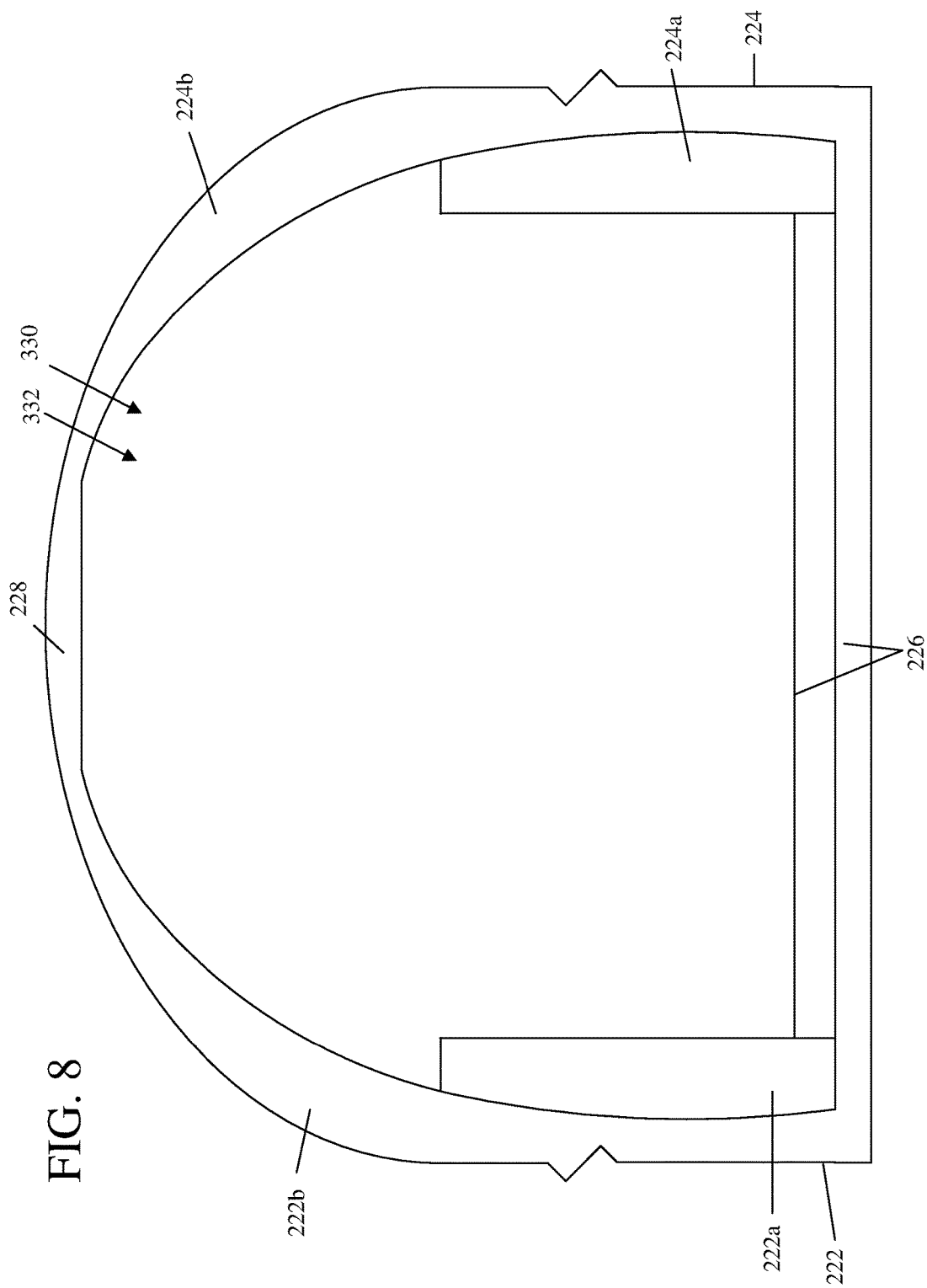
FIG. 8 is side view of the passenger vehicle without doors.

As shown in the left side views of FIG. 2 and FIG. 3, the vehicle body 120 generally includes a forward body structure 222, a rearward body structure 224, a floor structure 226, and a roof structure 228. The vehicle body 120 is also depicted in FIG. 8 without doors. The forward body structure 222, the rearward body structure 224, the floor structure 226, and the roof structure 228 are fixedly coupled to each other to cooperatively form the vehicle body 120 as a generally rigid structure but which may resiliently flex (e.g., under normal driving conditions). According to some exemplary embodiments, the vehicle body 120 may omit the roof structure 228, or the roof structure 228 may be movable.

The vehicle body 120 defines a passenger compartment 330 therein, while the forward body structure 222, the rearward body structure 224, and the floor structure 226 cooperatively define an opening 332 (e.g., entrance) that allows entry of a passenger into (e.g., ingress) and exit of a passenger out of (e.g., egress) the passenger compartment 330. The opening 332 may, but need not, be continuous between the forward body structure 222, the rearward body structure 224, the floor structure 226, and the roof structure 228 (if present). That is, the opening 332 is not physically divided (e.g., partitioned, interrupted, etc.) into multiple separate openings. Alternatively, the vehicle body may include an upright structure extending upward from the floor structure 226 toward or to the roof structure 228 at an intermediate fore-aft location of the opening 332 (e.g., such as a B-pillar structure).

The forward body structure 222, the rearward body structure 224, the floor structure 226, and the roof structure 228 may be individual components that are fixedly coupled to each other, or may be cooperatively formed by one or more components that are coupled to each other (e.g., a lower portion of the forward body structure 222 and a forward portion of the floor structure 226 may be formed by one or more common components). The vehicle body 120 may be similarly configured on its right side (not shown).

The forward body structure 222 generally includes a forward base structure 222a and a forward pillar structure 222b (e.g., A-pillar or first pillar structure or portion). The forward pillar structure 222b is coupled to and extends upward from the forward base structure 222a, and is coupled to and supports a forward end of the roof structure 228. A front window (e.g., a windshield 223 or windscreen; shown schematically in FIG. 2) may also be coupled to and supported by the forward pillar structure 222b and an opposite forward pillar structure (i.e., on a right side of the vehicle). The forward base structure 222a and the forward pillar structure 222b may be formed by one or more common components, or separate components coupled to each other. The forward body structure 222 transitions from, or demarcates between, the forward base structure 222a and the forward pillar structure 222b in a beltline 201 (e.g., beltline region) of the vehicle 100. The beltline 201 of the vehicle 100 is a location or region at an intermediate height of the vehicle 100 surrounding the transition or demarcation between opaque lower side structures of the vehicle structure (e.g., body and door panels) and transparent side windows (e.g., window panel or pane). While the beltline 201 is depicted as being straight and horizontal, the beltline 201 may follow other profiles (e.g., curved, non-horizontal, etc.).

The rearward body structure 224 includes a rearward base structure 224a and may also include one or more rearward pillar structures 224b (e.g., C-pillar, D-pillar, or second pillar structure or portion). The rearward pillar structure 224b is coupled to and extends upward from the rearward base structure 224a, and is coupled to and supports a rearward portion or end of the roof structure 228. A rear window (e.g., rear wide window or rear windshield; not shown) may also be coupled to and supported by the rearward pillar structure 224b. The rearward base structure 224a and the rearward pillar structure 224b may be formed by one or more common components, or separate components coupled to each other. The rearward body structure 224 is considered to transition from, or demarcate between, the rearward base structure 224*a* and the rearward pillar structure 224*b* in the beltline 201 of the vehicle 100. For vehicles 100 having a roof structure 228 that is movable (e.g., a convertible), the rearward pillar structure 224*b* may be movable or omitted.

The vehicle 100, on its left side, further includes a door 240 (e.g., first or front door) and another door 260 (e.g., second or rear door). The door 240 and the second door 260 are cooperatively configured to close the opening 332 (i.e., to prevent ingress and egress of passengers), while also being configured to absorb and transfer outboard loading (e.g., standardized loading) to the forward body structure 222, the rearward body structure 224, the floor structure 226, and/or the roof structure 228. The vehicle 100 may similarly include an additional door 240 and an additional second door 260 on its right side (not shown). According to other embodiments, the second door 260 may be omitted, such that the door 240, without another door, closes the opening 332.

The door 240 generally includes a door structure 242 and a window 244 (e.g., first window). The door 240 is movable between a closed position (e.g., a first closed position) as shown in FIG. 2 and an open position (e.g., a first open position) as shown in FIG. 3. The second door 260 similarly includes a door structure 262 (e.g., second or rear door structure) and a window 264 (e.g., second or rear window). The second door 260 is also movable between a closed position (e.g., a second closed position) as shown in FIG. 2 and an open position (e.g., a second open position) as shown in FIG. 3. When the door 240 and the second door 260 are simultaneously in their respective closed positions, the opening 332 is closed to prevent or restrict ingress into and egress out of the passenger compartment 330 by a passenger. The door 240 and the second door 260 may be slidably coupled to the vehicle body 120 as shown in FIG. 3, or may be hingedly coupled (e.g., pivotably coupled, as illustrated schematically in dashed lines in FIG. 1), for example, to the forward body structure 222 and the rearward body structure 224, respectively, about substantially vertical axes. In embodiments having an intermediate structure (e.g., B-pillar) that divides the opening 332, the door 240 and/or the second door 260 may be hingedly coupled to the intermediate structure (e.g., B-pillar; not shown). In embodiments without the second door 260, the door 240 may be hingedly coupled to forward body structure 222 or the rearward body structure 224.

Figure 4:
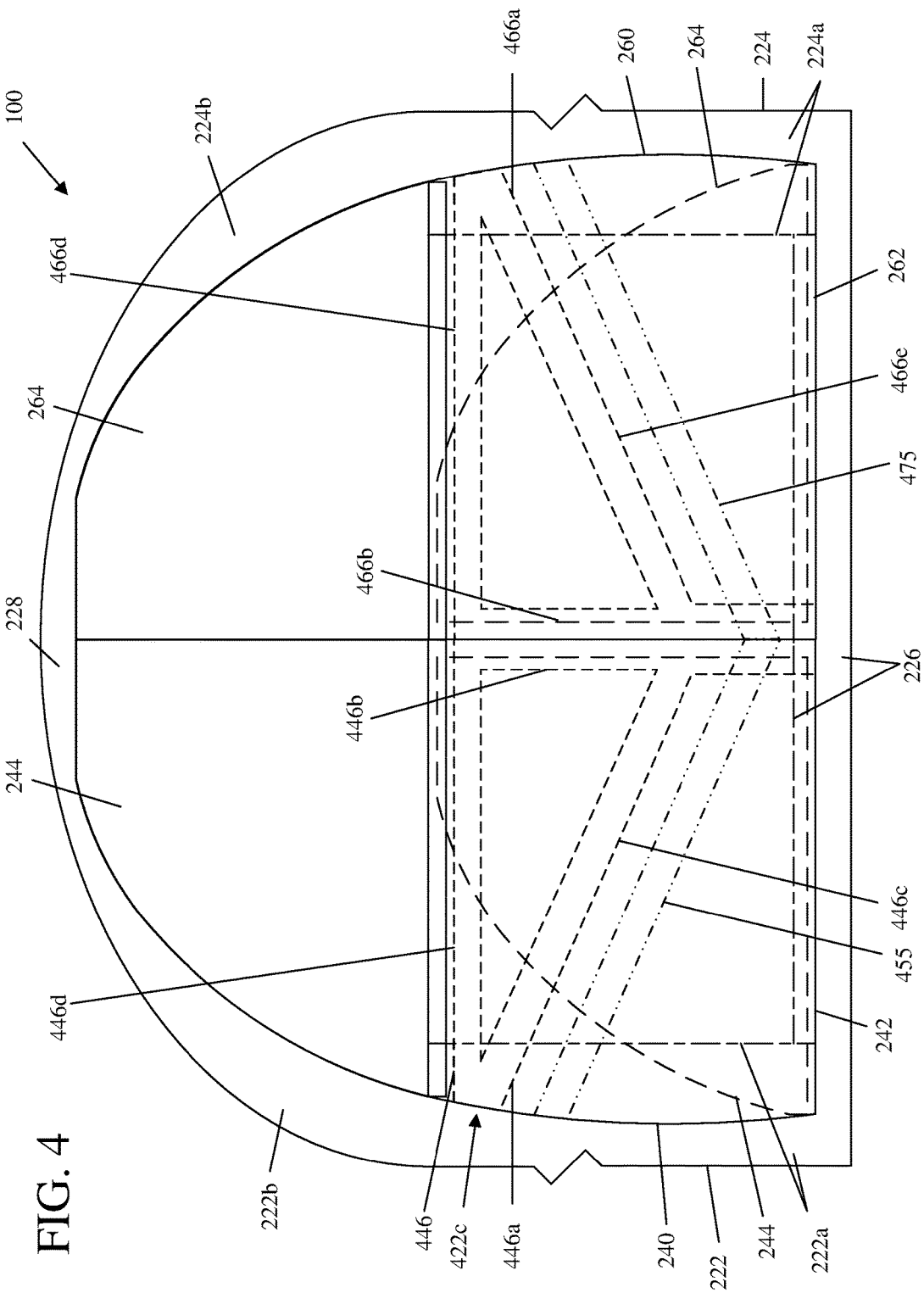
FIG. 4 is a side view of the passenger vehicle depicting various hidden components and structures in phantom.

As depicted schematically in FIG. 4, the door structure 242 of the door 240 includes a primary door structure 446 (e.g., a first or primary internal door structure; shown in dash-dash lines), which is coupled to and substantially hidden from view by an outer door structure 248 (e.g., first outer or secondary door structure). The door structure 262 of the second door 260 includes another primary door structure 466 (e.g., a second primary or internal door structure; shown in dash-dash lines), which is coupled to and substantially hidden from view by another outer door structure 268 (e.g., second outer or secondary door structure). The primary door structures 446, 466 of the doors 240, 260 are configured to cooperatively transfer a substantial majority of loading to the doors 240, 260 from the standard dynamic loading event (e.g., from an MDB during FMVSS dynamic testing) to the vehicle body 120 to limit intrusion into the passenger compartment 330. In FIG. 4, inboard edges of the forward base structure 222*a*, floor structure 226, and rearward base structure 224*a* are depicted in phantom as long-dash short-dash lines, which illustrate overlapping relationships for load transfer between the primary door structures 446, 466 to portions of the vehicle body 120.

As compared to the primary door structures 446, 466, the outer door structures 248, 268 and/or other structures and components of the doors 240, 260 are configured for absorbing, distributing, and/or transferring only an insubstantial portion of the standard dynamic loading to the vehicle body 120. However, the outer door structures 248, 268 and other door structures and components may be configured to absorb, distribute, and/or transfer substantial portions of other standard loading (e.g., such as the standard quasi-static loading applied during the quasi-static testing under FMVSS 214S), as will be discussed below. Furthermore, while the windows 244, 264 or other upper structures of the door 240 or second door 260 may engage the roof structure 228, according to some but not all embodiments, but such upper structures are capable of absorbing, distributing, and/or transferring an insubstantial portion of the standard loading to the vehicle body 120, such that substantial majorities of the standard dynamic and quasi-static loading of the doors 240, 260 is transferred to the vehicle body 120 independent of the roof structure 228. According to other exemplary embodiments, upper structures of one or both of the doors 240, 260 may be configured to transfer substantial portions of the standard loading to the vehicle body 120 (e.g., if the door 240 and/or the door 260 include movable B-pillar structures that extend from the floor structure 226 to the roof structure 228), or if the vehicle body 120 includes a fixed B-pillar structure extending from the floor structure 226 to the roof structure 228.

Focusing first on the door 240, the door structure 242 generally includes the outer door structure 248 and the primary door structure 446 (depicted in phantom as dash-dash lines in FIG. 4). The outer door structure 248 defines a cavity 1242*a* (e.g., door cavity) in which the primary door structure 446 is positioned and substantially hidden from view (see FIG. 12). Additionally, the window 244 retracts into the cavity 1242*a* entirely or substantially to be contained within the cavity 1242*a* when lowered.

Figure 5:
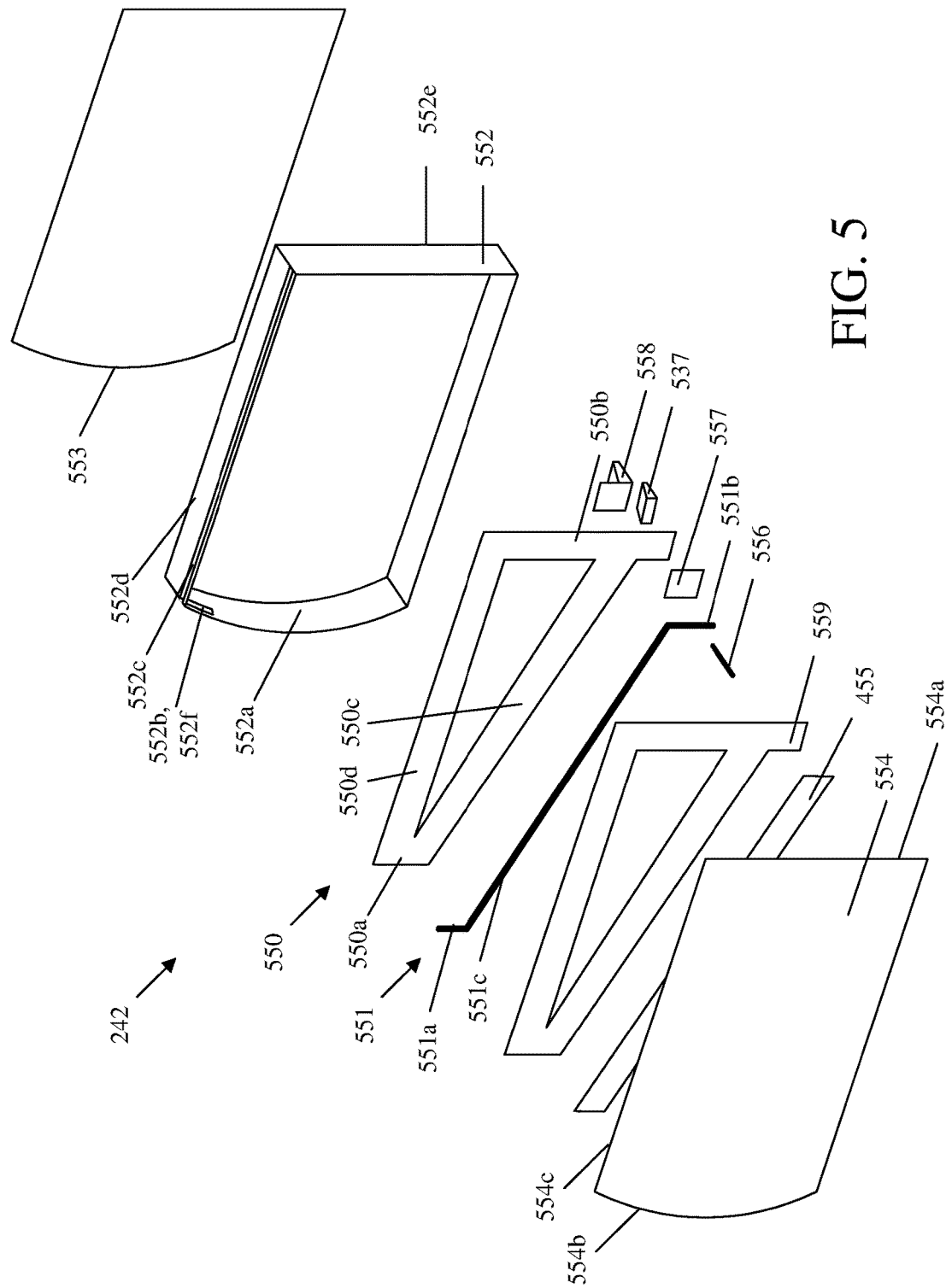
FIG. 5 is an upper perspective exploded view of a first door of the vehicle.

As shown in the exploded perspective view in FIG. 5, the outer door structure 248 includes an outer door frame 552 (e.g., peripheral or outer door frame or door structure), an inboard door panel 553 coupled to and positioned inboard of the outer door frame 552, and an outboard door panel 554 coupled to and positioned outboard of the outer door frame 552. As will be discussed in further detail below, when the door 240 is in the closed position, the primary door structure 446 overlaps and is in close proximity with the forward base structure 222*a* and the floor structure 226 of the vehicle body 120, so as to quickly transfer force thereto in an inboard direction upon application of standard dynamic loading to the door 240. For example, the primary door structure 446 may be positioned at an inboard location (e.g., adjacent the inboard door panel 553) in the cavity 1242*a* (see e.g., FIGS. 11-13 and 15-16).

The primary door structure 446 may additionally be configured to couple to and interface the floor structure 226, so as to substantially resist an inboard moment caused by standard dynamic loading to the door 240. As a result, the primary door structure 446 may not need to extend above the beltline 201 of the vehicle 100 at an intermediate fore-aft location of the vehicle 100, and no other structural member of the vehicle body 120 (e.g., a conventional B-pillar) or either door 240, 260 (e.g., a movable B-pillar) would extend upward from the primary door structure 446, which would otherwise be capable of transferring any substantial portion of the standard dynamic loading to the roof structure 228. By omitting such vertical structures, a substantially unobstructed view may be provided through the windows 244, 264 out the left side of the vehicle 100.

As shown in FIG. 5, the primary door structure 446 includes a primary structural member 550 (e.g., primary member) and a beam member 551, among other elements, which are coupled to each other. The primary structural member 550 and the beam member 551 form the primary door structure 446 with a forward portion 446a (e.g., first or forward end portion or region), a rearward portion 446b (e.g., first or rearward upright portion or region), an intermediate portion 446c (e.g., middle, diagonal, or lower intermediate portion or region), and an upper portion 446d (e.g., upper, top, or upper intermediate portion or region). The forward portion 446a is positioned proximate a forward end of the door 240, and may form a joint between the intermediate portion 446c and the upper portion 446d. The rearward portion 446b is positioned proximate a rearward end of the door 240, and may extend upward and downward relative to the intermediate portion 446c. The intermediate portion 446c may extend rearward and downward from the forward portion 446a to the rearward portion 446b. The upper portion 446d is positioned proximate an upper end of the door 240, and extends rearward from the forward portion 446a to the rearward portion 446b. While the primary door structure 446 is substantially hidden from view by the outer door structure 248, various limited portions of the primary door structure 446 may still protrude out of the cavity 1242a (e.g., in cutouts of the outer door frame 552 or inboard door panel 553), and/or may be concealed by other trim components, so as to be engageable with or otherwise transfer force to portions of the vehicle body 120 (e.g., the floor structure 226).

The primary structural member 550 (e.g., first primary structural or internal member) is a unitary, continuous member. For example, the primary structural member 550 may be a hot-stamped boron steel component. The primary structural member 550 includes a forward segment 550a (e.g., first forward end or segment), a rearward segment 550b (e.g., first rearward end or segment), an intermediate segment 550c (e.g., first intermediate segment), and an upper segment 550d (e.g., first upper segment). The forward segment 550a forms a joint that connects the intermediate segment 550c and the upper segment 550d, and may form an outboard convex or C-shaped recess, which receives the beam member 551 therein.

The intermediate segment 550c extends downward and rearward from the forward segment 550a to the rearward segment 550b. From the left side view, the intermediate segment 550c may extend downward and rearward at a constant angle, but may follow other contours. From a top view, the intermediate segment 550c may extend rearward at a constant angle, but may follow other contours (e.g., being curved in an inboard-outboard direction, such as to follow contours of the inboard door panel 553 and/or the outboard door panel 554). The intermediate segment 550c has a cross-sectional shape that is concave or C-shaped to provide rigidity to the intermediate segment 550c. The cross-sectional shape may be generally constant along a majority of the intermediate segment 550c. The intermediate segment 550c may extend at different angles and/or have an irregular or different cross-sectional shape.

The upper segment 550d extends rearward from the forward segment 550a to terminate at a rearward end thereof. The upper segment 550d may, for example, extend along the beltline 201. From the left side view, the upper segment 550d may extend at a constant angle (e.g., generally horizontal), or other suitable angle or contour. From a top view, the upper segment 550d may extend at a constant angle (e.g., straight rearward), but may follow other contours (e.g., being curved in an inboard-outboard direction, such as to follow contours of the inboard door panel 553 and/or the outboard door panel 554). The upper segment has a cross-sectional shape that is concave or C-shaped to provide rigidity to the upper segment 550d. The cross-sectional shape may be generally constant along a majority of the upper segment 550d. The upper segment 550d may alternatively have a different position, extend at different or varied angles, and/or have a different or irregular cross-sectional shape.

The rearward segment 550b extends upward and downward from the intermediate segment 550c to terminate at upper and lower ends, respectively, thereof. From the left side view, the rear segment extends straight above and below the intermediate segment 550c at generally constant angles (e.g., generally vertical), but may follow other contours (e.g., extending forward or rearward in a straight or curved manner). From a front view, the rearward segment 550b extends above and below the intermediate segment straight (e.g., generally vertical), but may follow other contours (e.g., extending inboard or outboard in a straight or curved manner, such as to follow contours of the inboard door panel 553 and/or the outboard door panel 554. The rear segment has a cross-sectional shape that is concave or C-shaped to provide rigidity to the rearward segment 550b. The cross-sectional shape is generally constant along a majority of the rearward segment 550b above the intermediate segment 550c. Below the intermediate segment 550c, the rear segment extends downward and inboard, and includes a convex or C-shaped cross-sectional shape. Alternatively, the rearward segment 550b may extend at different angles, with different contours, and/or have different cross-sectional shapes above and below the intermediate segment 550c.

The upper segment 550d and the rearward segment 550b may have a continuous joint therebetween (i.e., not terminate at rearward and upper ends, respectively, thereof), or may be coupled to each other with an intermediate bracket member (not shown).

While the primary structural member 550 has been described as a unitary member, it is contemplated that the primary structural member 550 instead be configured as a multi-piece structure, for example, with the upper segment 550d or other segments (or portions thereof), being formed with another member.

The beam member 551 (e.g., first beam member) is a unitary, continuous member. For example, the beam member 551 may be a hydroformed steel, tubular component. The beam member 551 includes a forward beam segment 551a (e.g., a first forward beam end), a rearward beam segment 551b (e.g., a first rearward beam segment), and an intermediate beam segment 551c (e.g., a first intermediate beam segment). The intermediate beam segment 551c extends substantially parallel with (i.e., following the contour of) the intermediate segment 550c and may be coupled thereto (e.g., with conventional fasteners, adhesives, and/or welding) to form the intermediate portion 446c of the primary door structure 446. The intermediate beam segment 551c may also be received within an outboard facing recess of the intermediate segment 550c of the primary structural member 550, which is formed by the concave cross-sectional shape thereof. The intermediate segment 551c has a cross cross-sectional shape (e.g., rectangular or box tubular), which may be constant along a majority thereof. Alternatively, the intermediate beam segment 551c may have a different contour (e.g., different than the primary structural member 550) and/or have a different or irregular cross-sectional shape.

The forward beam segment 551a extends upward from the intermediate beam segment 551c to terminate at an upper end thereof. The forward beam segment 551a may extend at a generally constant angle (e.g., substantially vertical), and have a cross-sectional shape (e.g., rectangular or box tubular) that provides rigidity to the forward beam segment 551a and that may be constant along a majority thereof. Alternatively, the forward beam segment 551a may extend at varying or different angles (e.g., non-vertical, bent, or varying) and/or have an irregular or different cross-sectional shape.

The forward beam segment 551a is coupled to the forward segment 550a of the primary structural member 550 (e.g., with fasteners, adhesives, and/or welding) to cooperatively form the forward portion 446a of the primary door structure 446. The forward beam segment 551a may also be received within the outboard facing recess of the forward segment 550a of the primary structural member 550, which is formed by the concave cross-sectional shape thereof.

The rearward beam segment 551b extends downward from the intermediate beam segment 551c to terminate at a lower end thereof, and may additionally extend inboard relative to the intermediate beam segment 551c, so as to follow the contour of the rearward segment 550b. The rearward beam segment 551b is coupled the rearward segment 550b of the primary structural member 550 below the intermediate segment 550c (e.g., with fasteners, adhesives, and/or welding) to cooperatively form at least part of the rearward portion 446b of the primary door structure 446. The rearward beam segment 551b may also be received within the outboard facing recess of the rearward segment 550b of the primary structural member 550, which is formed by the concave cross-sectional shape thereof.

The door 240 additionally includes an intrusion beam 455 (shown in dash-dot-dot-dash lines in FIG. 4). The intrusion beam 455 is configured to absorb and/or transfer loading to the vehicle body 120 from the standard quasi-static loading, so as to prevent or limit intrusion into the passenger compartment 330. The intrusion beam 455, for example, is coupled to the outer door frame 552, extending downward and rearward from a forward end to a rearward end of the door 240. The intrusion beam 455 is positioned, for example, below the intermediate segment 550c of the primary structural member. The intrusion beam 455 is also positioned at an outboard location within the cavity 1242a, for example proximate or in contact with the outboard door panel 554, so as to quickly absorb and/or transfer loading upon occurrence of the standard quasi-static loading (see, e.g., FIGS. 11-13 and 15-16). When the standard quasi-static load is applied to the intrusion beam 455, the loading may be transferred from the intrusion beam 455 to the vehicle body 120, for example, through other structures of the door 240 (e.g., the primary door structure 446 and/or the outer door structure 248) that are coupled to and/or in close proximity to the vehicle body 120 (e.g., the forward body structure 222 and/or floor structure 226).

The primary door structure 446 may additionally include various other components or members, such as a reinforcement member 557, a striker 537, a foot member 558, a bolt 556, and/or a shear panel 559. The reinforcement member 557 is interposed between the rearward beam segment 551b of the beam member 551 and the rearward segment 550b of the primary structural member 550, for example, to distribute loading between the primary structural member 550 and the beam member 551. The striker 537 may be part of a latch mechanism, which is received by a latch (not shown) coupled to the floor structure 226 to restrain the door 240 and/or transfer loading from the door 240 to the floor structure 226. The bolt 556 may, for example, couple the striker 537 to the primary structural member 550 and/or the beam member 551. The foot member 558 may, for example, engage the floor structure 226 to resist an inboard moment caused by the standard loading. The shear panel 559 is coupled to the primary door structure 446 (e.g., to the primary structural member 550), for example, to provide torsional rigidity to the primary door structure 446 to prevent twisting thereof during normal operation (e.g., opening and closing) of the door 240.

Turning to the second door 260, the door structure 262 of the second door 260 is configured similar to the door structure 242 of the door 240 but having the forward-rearward relationship of its various components generally reversed. The door structure 262 of the second door 260 generally includes the outer door structure 268 and the primary door structure 466. As shown in the exploded perspective view in FIG. 6, the outer door structure 268 includes an outer door frame 672 (e.g., peripheral door frame), an inboard panel 673 coupled to and positioned inboard of the outer door frame 672, and an outboard door panel 674 coupled to and positioned outboard of the outer door frame 672, which cooperatively define a cavity in which the primary door structure is positioned and substantially concealed from view in the manner described above for the primary door structure 446 of the door 240. The window 264 may be retractable into the door cavity in a manner similar to the window 244.

As shown schematically in FIG. 4, the orientation of the primary door structure 466 of the second door 260 is generally reversed in a fore-aft direction, as compared to the primary door structure 446 of the door 240. The primary door structure 466 generally includes a rearward portion 466a (e.g., second or rearward end portion or region), a forward portion 466b (e.g., second or forward upright portion or region), an intermediate portion 466c (e.g., second middle or diagonal portion or region) extending forward and downward from the rearward portion 466a to the forward portion 466b, and an upper portion 466d (e.g., second upper or top portion region) extending forward from the rearward portion 466a. As with the primary door structure 446 of the door 240, the primary door structure 466 of the second door, according to some embodiments, may not extend above the beltline 201 of the vehicle 100 at an intermediate fore-aft location of the vehicle 100, and no other structural member (e.g., a movable B-pillar) would extend upward from the primary door structure 466, which would be capable of transferring any substantial portion of the standard loading to the roof structure 228. Omission of such vertical structural members may provide a substantially unobstructed view out the side of the vehicle through the windows 244, 264.

Similar to the door 240, when the second door 260 is in the closed position, the primary door structure 466 overlaps and is in close proximity with the rearward base structure 224a and the floor structure 226 of the vehicle body 120, so as to quickly transfer force thereto in an inboard direction upon application of standard dynamic loading to the second door 260. For example, the primary door structure 466 may be positioned at an inboard location (e.g., adjacent the inboard panel 673) in the door cavity (see e.g., FIGS. 11-13 and 15-16). The primary door structure 466 of the second door 260 may additionally configured to couple to and interface the floor structure 226, so as to substantially resist an inboard moment caused by standard dynamic loading to the door 240.

Figure 6:
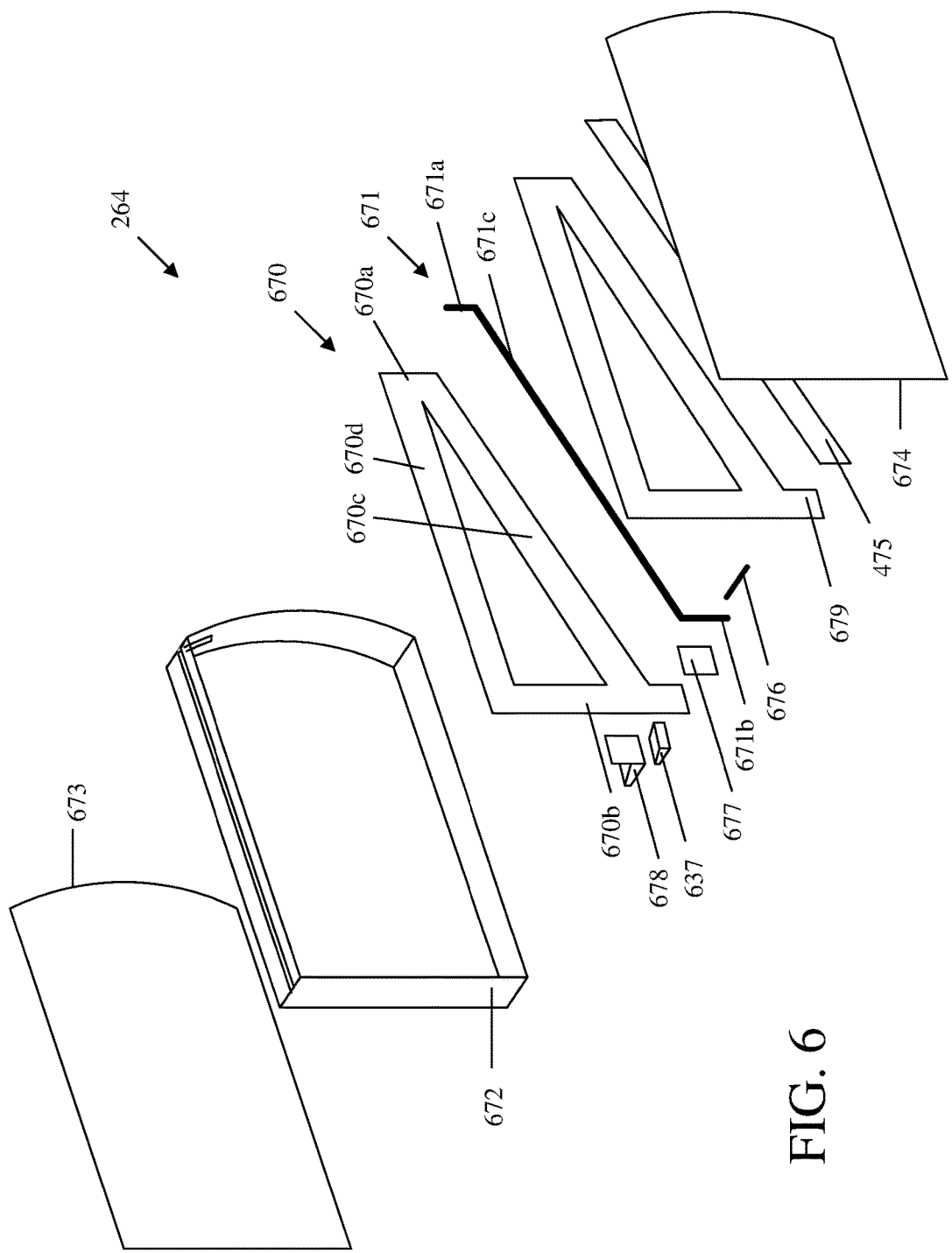
FIG. 6 is an upper perspective exploded view of a second door of the vehicle.

As shown structurally in FIG. 6, the components of the primary door structure 466 of the second door 260 are similar to those of the primary door structure 446 of the door 240 but are generally reversed in a fore-aft direction. Similar to the primary door structure 446 of the door 240, the primary door structure 466 of the second door 260 is formed by or comprises a primary structural member 670 and a beam member 671. The primary structural member 670 includes a rearward segment 670*a*, a forward segment 670*b*, an intermediate segment 670*c*, and an upper segment 670*d*. For further details, refer to discussion of the primary structural member 550 above. The beam member 671 includes a rearward beam segment 671*a*, a forward beam segment 671*b*, and an intermediate segment 671*c*. For further details, refer to discussion of the beam member 551 above.

The second door 260 additionally includes an intrusion beam 475, which is configured and functions similar to the intrusion beam 455 of the door 240. For example, the intrusion beam 475 is positioned below the intermediate segment 670*c* of the primary structural member 670 and is proximate the outboard door panel 674, so as to absorb and/or transfer the standard quasi-static loading alone and/or in conjunction with the intrusion beam 455 of the door 240. The second door 260 may also include other components similar to those of the door 240, such as a reinforcement member 677, striker 637, foot member 678, shear panel 679, and/or bolt 676.

When the door 240 and the second door 260 are simultaneously in the closed positions, the door 240 and the second door 260 cooperatively close the opening 332 (see FIG. 2). Individually and cooperatively, the door 240 and the second door 260 are also configured to distribute the standard dynamic load via the primary door structures 446, 466 to the vehicle body 120 (i.e., the forward base structure 222*a*, the rearward base structure 224*a*, and the floor structure 226) and the standard quasi-static load via the intrusion beams 455, 475.

When each of the door 240 and the second door 260 are in their respective closed positions, the primary door structures 446, 466 thereof overlap and are in close proximity to various parts of the vehicle body 120 of the vehicle 100 (see, e.g., FIGS. 4 and 11-16). These overlapping relationships and close proximity allow the primary door structures 446, 466 to quickly transfer standard dynamic loading to the vehicle body 120. For example, when the door 240 is in its closed position, the forward portion 446*a* of the primary door structure 446 overlaps an upper region 422*c* of the forward base structure 222*a* of the vehicle body 120 in a fore-aft direction, and is in close proximity in an inboard-outboard direction thereto. This overlapping relationship is within an intermediate vertical region of the vehicle 100 (e.g., a middle 50% of the opening, such as proximate the beltline 201). The rearward portion 446*b* of the primary door structure 446 similarly overlaps in a vertical direction the floor structure 226 in an intermediate fore-aft region of the vehicle (e.g., a middle 50% of the opening 332). The primary structural member 550 is positioned in closed proximity to the forward base structure 222*a* and/or the floor structure 226, but may include intermediate components positioned therebetween, such as the inboard door panel 553, which still allows quick loading to the vehicle body 120 upon occurrence of the standard dynamic loading event. The second door 260, when in its closed position, is configured to overlap the vehicle body 120 in a similar manner as the door 240 for transferring loading thereto.

Figure 7:
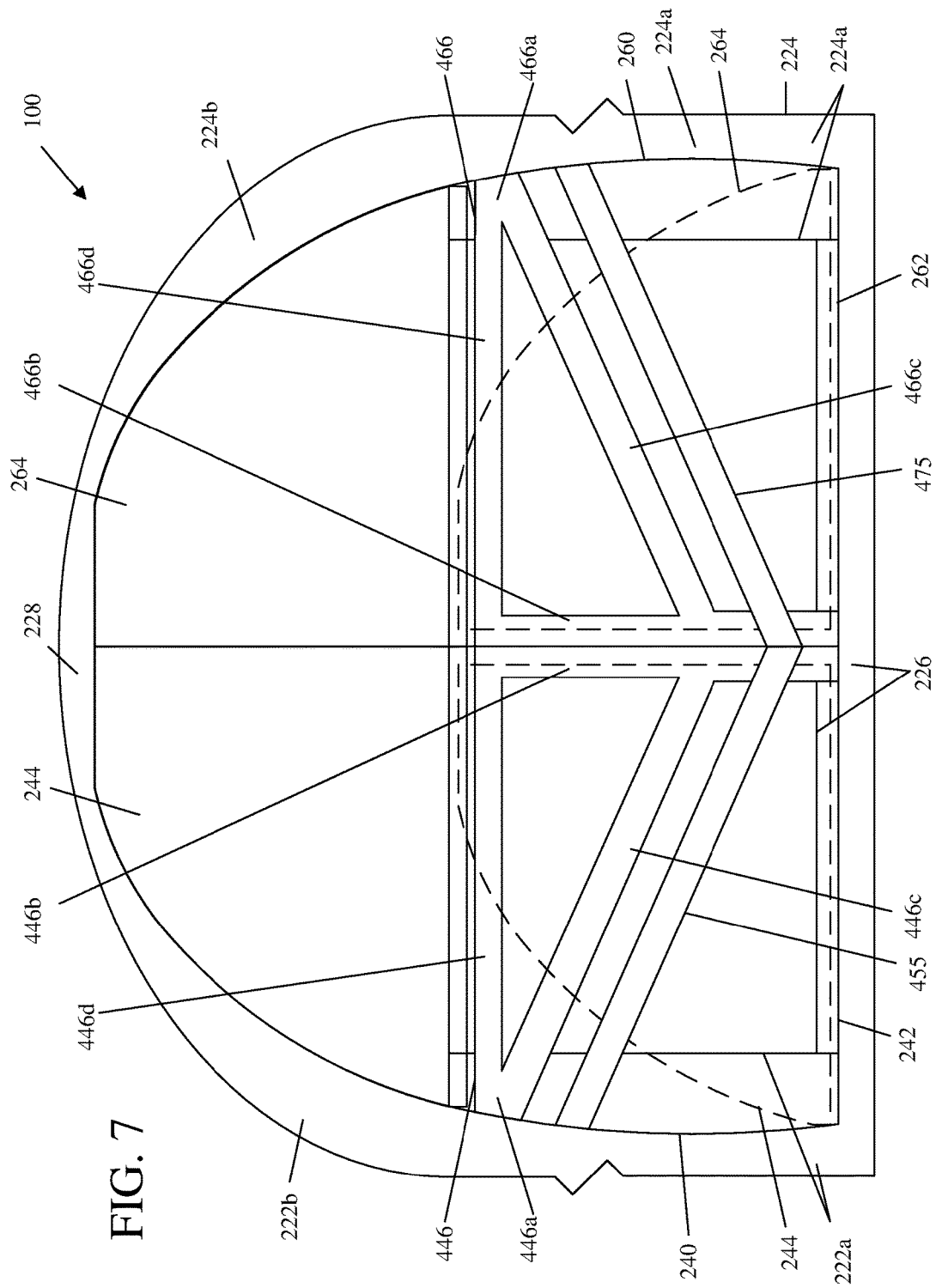
FIG. 7 is another side view of the passenger vehicle omitting outboard panels of the doors, which depicts windows of the door in lowered positions in phantom.
Figure 14:
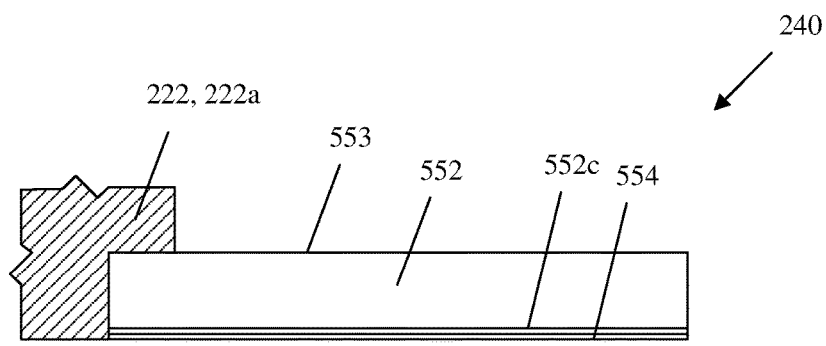
FIG. 14 is a cross-sectional view of the passenger vehicle taken along line 14-14 from FIG. 2.
Figure 15:
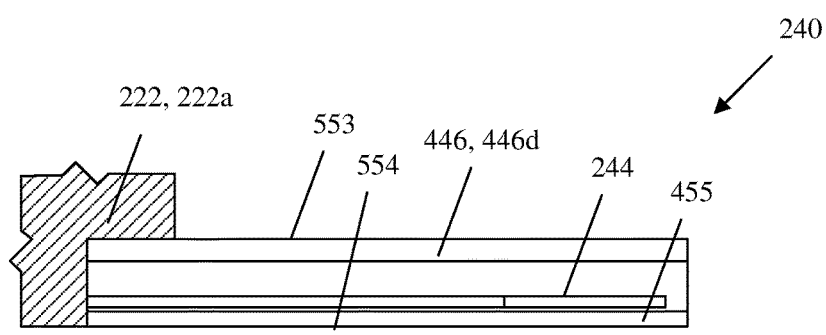
FIG. 15 is a cross-sectional view of the passenger vehicle taken along line 15-15 from FIG. 2.
Figure 16:
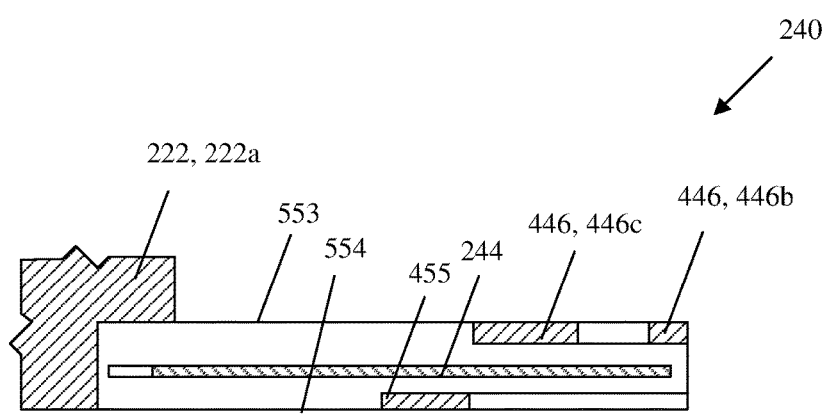
FIG. 16 is a cross-sectional view of the passenger vehicle taken along line 16-16 from FIG. 2.

Referring back to the door 240, the window 244 is configured to be moved between a lowered or retracted position and a raised or extended position. The various figures are provided to illustrate the spatial relationship of the window 244 relative to the various structures and components of the door 240 and the vehicle body 120. FIG. 4 depicts the vehicle with the window 244 in the raised position (solid lines) and in the lowered position (dash-dash lines), while various hidden structures of the door 240 and vehicle (i.e., those inboard of the outboard panel 564) are depicted in phantom. FIG. 7 depicts the door 240 in the vehicle 100 with the inboard and outboard door panels 553, 554 omitted and the window 244 in the raised position (solid lines) and in the lowered position (dash-dash lines), while also illustrating various internal structures in solid lines to show their overlapping relationships. FIGS. 9 and 10 depict the door 240 in isolation of the vehicle body 120. FIGS. 11-13 are cross-sectional views looking rearward, and FIGS. 14-16 are cross-sectional views looking downward.

As shown in FIG. 11, when in the lowered position, the window 244 is contained entirely within the cavity 1242*a* and, thereby, may be entirely hidden from view by the outer door structure 248. Alternatively, the window 244 may be substantially or partially contained within the cavity 1242*a* when in the lowered position, so as to be substantially or partially hidden from view.

As shown in FIGS. 12-13, when in the lowered position, the window 244 is positioned outboard of the primary door structure 446. That is, various portions of the window 244 may be spaced horizontally outboard from various portions of the primary door structure 446. For example, as shown in the side view of FIG. 7, as well as the cross-sectional view of FIG. 13, in an intermediate fore-aft region of the door 240, portions of the window 244 are positioned horizontally outboard of the primary door structure 466. More particularly, intermediate fore-aft portions of the window 244 are positioned horizontally outboard from separate, vertically spaced portions of the primary door structure 446 (e.g., the intermediate portion 446*c* and the upper portion 446*d*). Furthermore, depending on the movement path of the window 244 between the lowered and raised positions, a rearward edge 944*a* of the window 244 may be positioned horizontally outboard from the rearward portion 446*b* of the primary door structure 446 (as shown in FIG. 7), or may be positioned horizontally outboard of the intermediate portion 446*c* and/or the upper portion 446*d* of the primary door structure 446.

Additionally, when in the lowered position, the window 244 is positioned inboard of the intrusion beam 455. For example, the intermediate fore-aft portions or locations of the window 244 are positioned horizontally inboard of the intrusion beam 455 (see FIG. 7) at a different elevation (e.g., lower) than the upper and/or intermediate portions 446*d*, 446*c* of the primary door structure 446.

When moved between its lowered and raised positions, the window 244 is moved by a window operator 1090 (shown in FIG. 10; not shown in FIG. 9 for simplicity) along a path of travel 990, which is indicated by a dash-dot-dot-dash line. The path of travel 990 is outboard of the primary door structure 446 and inboard of the intrusion beam 455. For example, as viewed from a front of the vehicle (see, e.g., FIGS. 11-13), the path of travel 990 of the window 244 may generally follow the curvature (e.g., barrel) of the window 244, and pass between the primary door structure 446 and the intrusion beam 455. This movement results in various portions of the window 244 passing by or between various structural portions of the vehicle body 120 and the door 240. For example, as the window 244 is moved upward, a lower edge 944*d* (e.g., lower portion) of the window 244 moves through vertical positions that are horizontally inboard of the of the intrusion beam 455 and later horizontally outboard of the primary door structure 446 (e.g., the forward portion 446*a*). For example, a central location of the lower edge 944*d* of the window 244 moves past the intrusion beam 455, then the intermediate portion 4466*c* of the primary door structure 446, and then at least part of the upper portion 446*d* of the primary door structure 446.

A forward portion of the lower edge 944*d* of the window 244 may also be positioned horizontally outboard of the forward base structure 222*a*, so as to overlap the forward base structure 222*a* when moving and/or when in the raised and/or lowered positions. Also as the window 244 is moved upward, the lower edge 944*d* of the window 244 may be positioned horizontally inboard of the intrusion beam 455, then outboard the intermediate portion 446*c* of the primary door structure 446, and then outboard of the upper portion 446*d* of the primary door structure 446. When fully raised, the lower edge 944*d* of the window 244 is maintained within the cavity 1242*a* and may be positioned above the upper portion 446*d* of the primary door structure 446, or may be positioned horizontally outboard thereof (e.g., to overlap in a vertical direction).

The path of travel 990 may include a for-aft component. For example, as viewed from a side of the vehicle (see, e.g., FIGS. 9 and 10), the path of travel 990 initially follows an essentially straight path, then curves rearward as the window 244 approaches the raised position. This curved motion, for example, allows a rearward edge 944*a* (e.g., glass edge) of the window 244 to engage/disengage a forward edge of the window 264 (e.g., glass edge) or other member of the second door 260 (e.g., to form a seal therebetween) in a lateral direction and/or over a short distance of travel, so as to limit frictional wear caused by relative movement of the window 244 against another structure (e.g., sliding). An alternative path of travel 990' may, in the side view, extend at an essentially straight, non-vertical angle having a fore-aft component that moves the rearward edge 944*a* of the window 244 into or out of engagement with the window 264 of intermediate member. According to other exemplary embodiments, the path of travel is substantially vertical as viewed from a side of the vehicle 100.

To accommodate this fore-aft movement of the window 244, the outer door structure 248 may include a forward slot 552*b* (e.g., cutout) in the outer door frame 552 (see, e.g., FIGS. 5 and 11). The forward slot 552*b* extends through an upper end of a forward wall 552*a* (e.g., forward frame or forward cavity end, segment, or portion) of the outer door frame 552 and/or the cavity 1242*a* and is positioned along the path of travel 990 (see FIG. 10). More particularly, the path of travel 990 of a forward edge 944*b* (e.g., glass edge) of the window 244 may extend through the forward wall 552*a* and the forward slot 552*b* of the outer door frame 552 to accommodate the fore-aft movement proximate the raised position of the window 244. The forward slot 552*b*, thereby, allows the forward edge 944*b* of the window 244 to pass through the forward wall 552*a*, as the window 244 is moved between the raised and lowered positions. A seal 552*f* (e.g., gasket) may be positioned in or at the forward slot 552*b*, which seals the forward slot 552*b*. The seal 552*f* may, for example, include opposed members or portions made from a resilient material (e.g., elastomer) that engage each other and/or opposed sides of the window 244, depending on the position of the window 244 within the path of travel 990. While the outboard door panel 554 is shown as being generally coextensive with the outer door frame 552, it should be understood that the outboard door panel 554 may extend beyond the outer door frame 552 in forward, rearward, downward, and/or upper directions. If extending forward and/or rearward of the outer door frame 552, the forward slot 552*b* at a forward end and/or an additional rearward slot (not shown) may allow the window 244 to extend substantially the entire length of the outboard door panel 554, as will be discussed below.

As shown in FIG. 10, the window operator 1090 may, for example, include a motor 1092 (e.g., actuator or regulator) and a guide 1094 (e.g., track). The guide 1094 generally defines the path of travel (e.g., 990, 990'), while the bottom edge of the window 244 is movably coupled to the guide 1094 such that all portions of the window 244 move in the same manner within the path of travel. The motor 1092 functions to move the window 244 along the guide 1094 in response to various control inputs. Such control inputs may include, for example, user selection to raise or lower the window 244, or automated controls, such as to move the window 244 into/out of engagement with the window 264 or seal 229*b* interposed and/or compressed therebetween when the door 240 and/or the second door 260 are to be closed or opened. The guide 1094 and/or the motor 1092 of the window operator 1090 may, for example, be coupled to the primary door structure 446 or another structural component of the door 240. Since the guide 1094 defines the path of travel (e.g., 990, 990'), the guide 1094 is positioned outboard of the primary door structure 446 and inboard of the intrusion beam 455. According to other embodiments, the window operator 1090 may be configured to move the window 244 in other manners, for example, by rotating or moving transversely relative to the guide, for example, to come into and out of engagement with the window 264 of the second door 260, or be configured in another suitable manner.

When in the raised position, the window 244 may be positioned more outboard relative to the outboard door panel 554 as compared to traditional door structures, because the path of travel 990 is positioned outboard of the primary door structure 446. With reference to FIGS. 5 and 11-13, the window 244 passes through an upper slot 552*c* (e.g., cutout) in an upper wall 552*d* of the door structure 242 (e.g., though the outer door structure 248 and/or between other components, such as the inboard door panel 553 and/or the outboard door panel 554) when moved between the lowered and raised positions. The upper slot 552*c* is continuous with the forward slot 552*b*. The upper slot 552*c* is positioned, such that an outer surface of the window 244 is in close inboard-outboard proximity to an outer surface of the outboard door panel 554. For example, at various for-aft locations of the door 240, the outboard door panel 554 may protrude outboard from a lowermost visible portion of the window 244 (i.e., along the beltline 201) a relatively small horizontal distance (e.g., less than two inches, or more preferably less than one inch or one half inch) within a small vertical distance (e.g., less than six inches or less than three inches) from the visible portion of the window 244. This is in contrast to traditional doors, whose windows travel inboard relative to its internal load transfer structure, with the traditional outboard door panel protruding outboard in a pronounced manner (e.g., including a crease) below the window to provide volume for containing the load transfer structure outboard of the window. This traditional configuration gives the appearance that the window is offset in an inboard direction relative to the outer profile of the door.

With the outboard position of the window 244 and the outboard door panel 554 protruding outboard from the window 244 a relatively small horizontal distance, a door latch mechanism (not shown) is coupled to the primary door structure 446 (e.g., to the upper and/or rearward portions 446d, 446b, thereof) at a position inboard of the window 244 or the path of travel 990 of the window 244. The door latch mechanism may, for example, include one or more components (e.g., latches) that are moveable from a retracted position inboard of the window 244 rearward to receive or otherwise engage corresponding components of the latch mechanism coupled to the second door 260 or B-pillar structure (e.g., retractably so as to be positioned inboard of the window 264 of the second door 260). With the latch mechanism being positioned inboard of the window 244, the door 240 may include an input device positioned outboard of the window 244 (e.g., an electronic sensor) configured to receive a user input from an outboard position relative to both the latch mechanism and the window path of travel 990, which operates to release the latch mechanism for opening the door 240 and/or the second door 260.

When the in the raised position, the window 244 protrudes through the upper slot 552c, such that the forward edge 944b and/or an upper edge 944c of the window 244 engages the forward pillar structure 222b, or a seal member 229a thereof. A rearward edge 944a of the window 244 may also engage a forward edge of the window 264 of the second door 260, or a seal member 229b (e.g., seal or seal component) therebetween. Alternatively, the door 240 may include a window frame, which the forward, upper, and/or rearward edges of the window 244 engage in the raised position. The seal member 229a may be coupled to the vehicle body 120 (e.g., coupled to and extending along the forward pillar structure 222b and/or the rearward pillar structure 224b) and be considered a component of the vehicle body 120. The forward edge 944b (e.g., glass edge) of the window 244 engages the seal member 229a. Accordingly, the windows 244, 264 may be considered to engage the vehicle body 120 or engage a portion or structure of the vehicle body 120 (e.g., the forward pillar structure 222b and/or the rearward pillar structure 224b) when and/or by engaging a seal member coupled thereto.

As shown in FIG. 9 (see also FIGS. 2, 4, and 7), when in the raised position, the forward edge 944b of the window 244 is substantially coextensive with a forward end of the door structure 242 in the fore-aft direction at the beltline 201 (e.g., within approximately one inch, or more preferably within less than ½ inch, such as within ¼ inch or less). The forward end of the door structure 242 may, for example, be formed by a forward wall 552a of the outer door frame 552 (e.g., a forward end of the cavity 1242a) and/or a forward edge 554b (e.g., forward panel edge) of the outboard door panel 554 (i.e., that which forms a cutline along with the forward base structure 222a), such that the forward edge 944b of the window 244 is substantially coextensive in the fore-aft direction with the forward wall 552a of the outer door frame 552, the forward edge 554b of the outboard door panel 554, or both. As a result, at the forward end of the door 240 at the beltline 201 (i.e., where the window 244 protrudes from the door structure 242), the forward edge 944b of the window 244 may engage the vehicle body 120, such as the forward base structure 222a and/or the forward pillar structure 222b of the forward body structure 222, or a seal member (not shown) thereof. Stated differently, the forward edge 944b of the window 244 engages the vehicle body 120 (e.g., the forward pillar structure 222b or seal member 229a) substantially immediately above the door structure 242 (e.g., within approximately one inch, or less) or otherwise in close proximity to an upper end of the door structure 242.

With the forward edge 944b of the window 244 being substantially coextensive with the forward end of the door structure 242, fixed or non-retractable structures of traditional doors may be omitted, so as to provide a larger openable area above the door structure 242 (i.e., above the beltline 201) and to also provide a less restricted view out a side of the vehicle 100 as compared to vehicles having traditional door structures.

The forward edge 944b of the window 244 being substantially coextensive with the door structure 242 also allows the vehicle 100 to have a continuous cutline between the vehicle body 120 (e.g., the forward base structure 222a and/or the forward pillar structure 222b) and the door structure 242 and the window 244 of the door 240 as viewed from a side of the vehicle. Moving vertically, the cutline transitions immediately (e.g., within approximately one inch or less moving vertically) from the door structure 242, particularly the outboard door panel 554 and any seal or trim component (not shown) of the upper slot 552c, to the window 244. For example, no static or otherwise non-retractable portion of the door 240, other than a seal member, trim component, or other component having an insubstantial height (e.g., less than one inch) is arranged above the beltline between where the outboard door panel 554 and the window 244 cooperatively form the cutline with the forward body structure 222. The forward edges 554b, 944b of the outboard door panel 554 and the window 244 may thereby form a substantially continuous forward edge of the door 240 at the beltline (e.g., in upper and lower regions adjacent and above and below the upper edge 554c of the outboard door panel 554), and may also follow a substantially continuous profile therebetween (e.g., following a substantially constant curvature (as shown) or straight angle on either side of the beltline, for example, with a common fore-aft position and approximately the same vertical angle), or other profile as may be desirable. Furthermore, in combination with the window 244 emerging from door structure 242 at an outboard location and the outboard door panel 554 protruding outboard a relatively small horizontal distance, as described above, the substantial coextensivity of the forward edges 554b, 944b of the outboard door panel 554 and window 244 may provide the appearance of a continuous, uninterrupted cutline from multiple vantages points besides a direct side view (e.g., forward and/or rearward of a direct side view).

When in the raised position, the rearward edge 944a of the window 244 may also be substantially coextensive in the fore-aft direction with the rear end of the door structure 242 at the beltline (e.g., within approximately one inch, or more preferably within less than ½ inch, such as within ¼ inch or less). The rearward end of the door structure 242 may, for example, be formed by the outer door frame 552 and/or a rearward end of the outboard door panel 554 (i.e., that which may form a cut line with the second door 260), such that the rearward edge 944a of the window 244 is substantially coextensive in the fore-aft direction with a rearward wall 552e (e.g., rearward end) of the outer door frame 552, a rearward edge 554a (e.g., rearward panel edge) of the outboard door panel 554, or both. For embodiments of the vehicle 100 that have an opening 332 that is continuous, or that otherwise do not include an intermediate pillar structure (e.g., a B-pillar) extending above the beltline, this provides that the rearward edge 944a of the window 244 may directly engage the forward edge of the window 264 of the second door 260, or a seal member 229b interposed and/or compressed therebetween. With the forward edge 944b and the rearward edge 944a of the window 244 being substantially coextensive in the fore-aft direction with the forward and reward edges, respectively, of the door structure 242 (e.g., forward and rearward edges 554b, 554a of the outboard door panel 554, or forward and rearward walls 552a, 552e of the outer door frame 552), the window 244 extends substantially the entire length (e.g., within approximately one inch) of the upper end of the door structure 242 (e.g., the upper end of the outer door frame 552 and/or the upper edge 554c of the outboard door panel 554).

The second or second door 260, including the door structure 262 and the window 264, may be configured in a similar manner to the door 240 (e.g., front door), albeit with the orientation of its various structures, components, and movement being reversed in a fore-aft direction. As a result, the window 264 may be configured to move relative to the door structure 262 in a similar manner as the window 244, such as in a path of travel outboard of the primary door structure 466 and inboard of the intrusion beam 475 to engage the rearward body structure 224. The window 244 may also extend from the door structure 262 at an outboard position, while the outboard door panel 674 may protrude outboard relative to the window 264 a relatively small horizontal distance, as described above for the door 240. Additionally, a rear edge of the window 264 may be substantially coextensive in the fore-aft direction with a rear end of the door structure 262 (e.g., rear edge of the outboard door panel 674), so as to provide a larger openable area, larger unobstructed view, and/or continuous cut line with the rearward body structure 224 in the manners described above for the door 240. A forward edge of the window 264 may be substantially coextensive in the fore-aft direction with a forward end of the door structure 262 (e.g., the forward end of the outer door frame 672 and/or the forward edge of the outboard door panel 674), such that a forward edge of the window 264 may engage the rearward edge 944a of the window 244 of the door 240 or a seal member 229b interposed therebetween. With both the forward and rearward edges of the window 264 being coextensive with the door structure 262 (e.g., the outboard door panel 674), the window 264 and the door structure 262 (e.g., the outboard door panel 674) may have substantially the same length (e.g., within approximately one inch) as the upper end of the door structure 262 (e.g., the upper edge of the outboard door panel 674). For further understanding of the second door 260 and its interface with the rearward body structure 224, refer to discussion of comparable components of the door 240 and the forward body structure 222.

In embodiments in which the door 240 and the second door 260 are configured with windows 244, 264 that are substantially coextensive with upper ends of the door structures 242, 262 (e.g., the upper edges of the outboard door panels 554, 674), the windows 244, 264 span substantially the entire length of the opening 332 at the beltline. This advantageously provides occupants a substantially unobstructed view through the opening 332 above the beltline, which may be further facilitated by use of a transparent or translucent material for the seal member 229b between the windows 244, 264.

Additionally, the door 240 and the second door 260 are configured to open independent of each other, such when in their respective closed positions, either the door 240 or the second door 260 may be moved to its open position, while the other door remains in its closed position. When either the door 240 or the second door 260 is to be opened, the windows 244, 264 may be moved out of engagement with or away from each other in a fore-aft direction. For example, when the door 240 is initiated to be opened (e.g., in response to a user input), the window 244 may be moved a short distance along the path of travel 990, which includes moving the window 244 forward out of engagement with the window 264 of the second door 260 or any seal member interposed therebetween, thereby allowing the door 240 to be opened (e.g., either by a sliding or rotating motion) without the windows 244, 264 interfering with each other. When the door 240 is initiated to open, the window 264 may instead or additionally be configured to move a short distance along its path of travel to move the windows 244, 264 out of engagement with each other.

What is claimed is:

1. A passenger vehicle comprising:
    a vehicle body defining a passenger compartment having an opening for a passenger to enter into and exit out of the passenger compartment;
    a powertrain for propelling the passenger vehicle on a public roadway;
    a first door movably coupled to the vehicle body to at least partially close the opening, the first door having a first door structure and a first window, wherein the first door structure defines a first cavity, and the first window is movable between a first lowered position in the first cavity and a first raised position in which a first forward edge of the first window is substantially coextensive with a forward end of the first cavity in a fore-aft direction at a beltline of the passenger vehicle; and
    a second door movably coupled to the vehicle body to at least partially close the opening and having a second window having a second forward edge, wherein when the first window is in the first raised position, a rearward edge of the first window at least one of engages the second forward edge or compresses a seal with the second forward edge.

2. The passenger vehicle according to claim 1, wherein in the first raised position, a first rearward edge of the first window is substantially coextensive with a first rearward end of the first cavity in the fore-aft direction at the beltline.

3. The passenger vehicle according to claim 2, wherein the second door includes a second door structure defining a second cavity, the second window is movable between a second lowered position in the second cavity and a second raised position in which the second forward edge of the second window is substantially coextensive with a second forward end of the second cavity in the fore-aft direction at the beltline.

4. The passenger vehicle according to claim 3, wherein the first door and the second door cooperatively close the opening.

5. The passenger vehicle according to claim 1, wherein the first door and the second door are each one of pivotably coupled or slidably coupled to the vehicle body.

6. The passenger vehicle according to claim 5, wherein the first door is pivotably coupled to a forward body structure of the vehicle body, and the second door is pivotably coupled to a rearward body structure of the vehicle body.

7. The passenger vehicle according to claim 5, wherein the first door and the second door are slidably coupled to the vehicle body.

8. The passenger vehicle according to claim 1, wherein the first door structure includes in the first cavity a first primary internal door structure and an intrusion beam, wherein the first window follows a path of travel between the first lowered position and the first raised position, the path of travel being outboard of the primary internal door structure and inboard of the intrusion beam.

9. The passenger vehicle according to claim 8, wherein the first primary internal door structure includes a lower intermediate portion extending in a fore-aft direction and an upper intermediate portion extending in the fore-aft direction and spaced above the lower intermediate portion, and when the first window is raised from the first lowered position to the first raised position, a central location of a lower edge of the first window passes the intrusion beam, then the lower intermediate portion, and then at least part of the upper intermediate portion.

10. The passenger vehicle according to claim 9, wherein the second door includes a second door structure that defines a second cavity, and the second window is movable between a second lowered position in the second cavity; and
wherein the second door structure includes a second primary internal door structure and a second intrusion beam located in the in the second cavity outboard of the second primary internal door structure, and the second window passes between the second primary internal door structure and the second intrusion beam when raised from a second lowered position to a second raised position.

11. The passenger vehicle according to claim 1, wherein in the first raised position, the first forward edge of the first window engages a forward pillar structure the vehicle body substantially immediately above the first door structure, and the forward pillar structure supports a windshield of the passenger vehicle.

12. The passenger vehicle according to claim 11, wherein when in the forward pillar structure includes a seal member that extends along the forward pillar structure and is compressed between the forward pillar structure and the first forward edge of the first window substantially immediately above the first door structure, and the first forward edge of the first window engages the forward pillar structure by engaging the seal member.

13. The passenger vehicle according to claim 1, wherein the first forward edge of the first window is within approximately one inch of the forward end of the first cavity in the fore-aft direction to be substantially coextensive therewith.

14. A door for a passenger vehicle for use on a public roadway, the door comprising:
a door structure defining a cavity, the door structure including an outboard panel, a primary internal door structure located within the cavity, and an intrusion beam located within the cavity; and
a window movable between a retracted position within the cavity and a raised position protruding from the cavity;
wherein when in the retracted position, the window is outboard of the primary internal door structure and inboard of the intrusion beam; and
wherein the primary internal door structure is configured to overlap a forward body structure and a floor structure of the passenger vehicle.

15. A door for a passenger vehicle for use on a public roadway, the door comprising:
a door structure defining a cavity, the door structure including an outboard panel, a primary internal door structure located within the cavity, and an intrusion beam located within the cavity; and
a window movable between a retracted position within the cavity and a raised position protruding from the cavity;
wherein when in the retracted position, the window is outboard of the primary internal door structure and inboard of the intrusion beam; and
wherein when in the raised position, a forward edge of the window is substantially coextensive with a forward cavity end of the cavity.

16. The door according to claim 15, wherein when in the raised position, the forward edge of the window is substantially coextensive with a forward end of the outboard panel at an upper end of the door structure.

17. The door according to claim 16, wherein when in the raised position, the forward edge of the window is within approximately one inch of the forward end of the outboard panel in a fore-aft direction to be substantially coextensive therewith.

18. The door according to claim 14, wherein the outboard panel protrudes outboard approximately one inch or less moving four inches downward from an upper edge of the outboard panel.

19. A vehicle comprising:
a vehicle body defining a passenger compartment and having an opening for passengers to enter into and exit from the passenger compartment, wherein the vehicle body includes a body structure that supports a windshield;
a powertrain for propelling the vehicle on a public roadway; and
a vehicle door and another vehicle door movable between open positions allowing passengers to enter into and exit from the passenger compartment and closed positions cooperatively closing the opening to restrict passengers from entering into and exiting from the passenger compartment, wherein the vehicle door includes a retractable window that indirectly engages the body structure and another window of the other vehicle door in a beltline of the vehicle;
wherein the vehicle door includes a cavity, and the retractable window is retractable between a lowered position in the cavity and a raised position indirectly engaging the body structure and the other window, and wherein when in the raised position, a forward edge of the window is substantially coextensive with a forward cavity end of the cavity.

20. The vehicle according to claim 19, wherein the body structure includes a seal that is compressed by the retractable window in the beltline, and the retractable window indirectly engages the body structure by engaging the seal, and wherein the retractable window engages the other window by compressing another seal therebetween.

21. A vehicle comprising:
a vehicle body defining a passenger compartment and having an opening for passengers to enter into and exit from the passenger compartment, wherein the vehicle body includes a body structure that supports a windshield;
a powertrain for propelling the vehicle on a public roadway; and
a vehicle door and another vehicle door movable between open positions allowing passengers to enter into and exit from the passenger compartment and closed positions cooperatively closing the opening to restrict passengers from entering into and exiting from the passenger compartment, wherein the vehicle door includes a retractable window that indirectly engages the body structure and another window of the other vehicle door in a beltline of the vehicle;

wherein the vehicle door includes a primary structure in a cavity thereof, wherein when the door is in the closed position, the primary door structure overlaps a forward body structure and a floor structure of the vehicle body.

* * * * *

UNITED STATES PATENT AND TRADEMARK OFFICE
CERTIFICATE OF CORRECTION

Page 1 of 1

PATENT NO. : 10,286,761 B1
APPLICATION NO. : 15/613969
DATED : May 14, 2019
INVENTOR(S) : John Raff and Donald R. Monroe It is certified that error appears in the above-identified patent and that said Letters Patent is hereby corrected as shown below:

In the Claims
In Column 19, Claim Number 10, Line 17:
"located in the in the second cavity"
Should be:
--located in the second cavity--.

Signed and Sealed this
Twenty-fifth Day of June, 2019

Andrei Iancu
*Director of the United States Patent and Trademark Office*